United States Patent
Jen

(10) Patent No.: US 8,526,344 B2
(45) Date of Patent: Sep. 3, 2013

(54) METHOD OF POWER INFORMATION REPORTING FOR ENHANCING UPLINK POWER CONTROL

(75) Inventor: Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 117 days.

(21) Appl. No.: 13/102,075

(22) Filed: May 6, 2011

(65) Prior Publication Data

US 2012/0113833 A1 May 10, 2012

Related U.S. Application Data

(60) Provisional application No. 61/332,184, filed on May 6, 2010.

(51) Int. Cl.
*H04B 7/00* (2006.01)

(52) U.S. Cl.
USPC ......................................... 370/310.2; 370/349

(58) Field of Classification Search
USPC ...................................... 370/349, 252, 310.2
See application file for complete search history.

(56) References Cited

U.S. PATENT DOCUMENTS

| | | | |
|---|---|---|---|
| 2009/0116599 A1 | 5/2009 | McCoy | |
| 2010/0074201 A1 | 3/2010 | Wu | |
| 2011/0080838 A1* | 4/2011 | Larsson et al. | 370/252 |

FOREIGN PATENT DOCUMENTS

| | | |
|---|---|---|
| CN | 101686489 A | 3/2010 |
| WO | 2008094014 A2 | 8/2008 |
| WO | 2009039447 A1 | 3/2009 |

OTHER PUBLICATIONS

European patent application No. 11003748.8, European Search Report mailing date: Aug. 18, 2011.
Jen, Title of Invention: Method of Enhancing Uplink Transmission and Related Communication Device, U.S. Appl. No. 13/102,069, filed May 6, 2011.
European patent application No. 11003749.6, European Search Report mailing date: Feb. 16, 2012.
HTC, "Power Headroom Reporting", 3GPP TSG-RAN WG1 #60bis, R1-102309, Apr. 12-16, 2010, Beijing, China, XP050419731, pp. 1-2.
3GPP TS 36.213 V9.0.1 (Dec. 2009) Technical Specification 3rd Generation Partnership Project; Technical Specification Group Radio Access Network; Evolved Universal Terrestrial Radio Access (E-UTRA); Physical layer procedures (Release 9).
3GPP TS 36.321 V9.0.0 (Sep. 2009) Technical Specification 3rd Generation Partnership Project; Technical Specification Group Radio Access Network; Evolved Universal Terrestrial Radio Access (E-UTRA) Medium Access Control (MAC) protocol specification (Release 9).
3GPP TS 36.211 V8.7.0 (May 2009) Technical Specification 3rd Generation Partnership Project; Technical Specification Group Radio Access Network; Evolved Universal Terrestrial Radio Access (E-UTRA); Physical Channels and Modulation (Release 8).
European patent application No. 11003749.6, European Search Report mailing date: Oct. 20, 2011.
Research in Motion, UK Limited, "PH reporting for Carrier Aggregation", 3GPP TSG RAN WG1 Meeting #61, R1-103066, May 10-14, 2010, Montreal, Canada, XP050420155, p. 1-2.

(Continued)

*Primary Examiner* — Brenda H Pham
(74) *Attorney, Agent, or Firm* — Winston Hsu; Scott Margo

(57) ABSTRACT

A method of power information reporting for enhancing uplink power control in a wireless communication system is disclosed. The method comprises reporting a physical uplink control channel (PUCCH) power headroom report (PHR) on a physical uplink shared channel (PUSCH) in a reporting subframe for each of at least one PUCCH transmission in a first subframe.

27 Claims, 6 Drawing Sheets

(56) References Cited

OTHER PUBLICATIONS

LG Electronics, "Remaining issues about power headroom reporting for LTE-A", 3GPP TSG RAN WG1 #61, R1-102693, May 10-14, 2010, Montreal, Canada, XP050419900, p. 1-5.

Ericsson, ST-Ericsson, "Power headroom reporting for carrier aggregation", 3GPP TSG RAN WG1 Meeting #61, R1-102615, May 10-14, 2010, Montreal, Canada, XP050419834, p. 1-2.

HTC, "Power Headroom Reporting", 3GPP TSG-RAN WG1 #61, R1-102732, May 10-14, 2010, Montreal, Canada, XP050420354, p. 1-3.

Nokia Corporation, Nokia Siemens Networks, "Power Headroom Reporting", 3GPP TSG-RAN WG2 Meeting#62, R2-082197, May 5-9, 2008, Kansas City, USA, XP002537452, p. 1-4.

Office action mailed on Jun. 5, 2013 for the China application No.201110117233.6, filing date May 6, 2011, p. 1-8.

* cited by examiner

METHOD OF POWER INFORMATION REPORTING FOR ENHANCING UPLINK POWER CONTROL

CROSS REFERENCE TO RELATED APPLICATIONS

This application claims the benefit of U.S. Provisional Application No. 61/332,184 filed on May 6, 2010 and entitled "Method and Apparatus for enhancement of Uplink Power Control and SRS", the contents of which are incorporated herein.

BACKGROUND OF THE INVENTION

1. Field of the Invention

The application relates to a method used in a wireless communication system and related communication device, and more particularly, to a method of enhancing uplink power control in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation, enhanced multi-antenna support and relaying. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz.

Power control is about setting transmit power levels, typically with the aim of improving system capacity, coverage, and user quality (data rate or voice quality) and reducing power consumption. To reach these objectives, power-control mechanisms typically attempt to maximize the received power of desired signals while limiting interference.

The LTE uplink is orthogonal, which is, at least in the ideal case, no interference between users in the same cell. The amount of interference to neighbor cells depends, among other things, on the position of the UE-more specifically, on the path gain from the terminal to these cells. In general, the closer the UE is to a neighboring cell the stronger the interference to that cell.

For uplink (UL) power control, it is necessary to provide UE with a proper UL transmission power (e.g. to save power) and to restrict UL interference. In LTE system, both downlink (DL) and UL power control are defined. Power headroom report (PHR) is triggered according to 3GPP TS 36.321.

To assist the network scheduler, a media access control (MAC) layer of UE performs and reports channel measurement. The PHR informs the network of the difference between the UE's current transmit power and its maximum transmit power.

In LTE-A system (e.g. Rel-10), it's been agreed that simultaneously PUCCH and PUSCH transmission. Consequently, eNB should take into account PUCCH transmission power contributing to the UE current transmission power so as to assist eNB to schedule PUSCH. The composite PUCCH/PUSCH PHR doesn't provide enough information on the PUCCH and PUSCH transmission power level. In addition, accumulative PUCCH and PUSCH power control error could happen (e.g. miss detection or detection error).

It's agreed in LTE-A system (e.g. Rel-10) to have one UE specific UL CC configured for PUCCH. Consequently, PUCCH PHR should only be reported on the configured UL CC since PHR is CC specific. However, there should be another alternative since eNB knows on which UL CC PUCCH is allowed to be transmitted.

The eNB should determine PUSCH grant/Modulation and coding scheme (MCS) according to its knowledge on when PUCCH has occurred or is going to occur. However, miss detection/detection error (e.g. PUCCH content) and Transmission Power Control (TPC) command errors could happen.

SUMMARY OF THE INVENTION

A method of enhancing uplink power control for enhancing uplink power control in a wireless communication system is provided.

A method of power information reporting for enhancing uplink power control in a wireless communication system is disclosed. The method comprises reporting an physical uplink control channel (PUCCH) power headroom report (PHR) on a physical uplink shared channel (PUSCH) in a reporting subframe for each of at least one PUCCH transmission in a first subframe.

A method of enhancing power information reporting for enhancing uplink power control for a mobile device in a wireless communication system is disclosed. The method comprises reporting an physical uplink control channel (PUCCH) power headroom report (PHR) in a reporting subframe on a first uplink component carrier (UL CC) with available physical uplink shared channel (PUSCH) grant, for each of at least one PUCCH transmission in a first subframe.

A method of enhancing uplink power control for a mobile device in a wireless communication system is disclosed. The method comprises including an physical uplink control channel (PUCCH) power headroom report (PHR) for each of at least one PUCCH transmission, physical uplink shared channel (PUSCH) PHR and a PUCCH format index in a PHR report in a reporting subframe.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
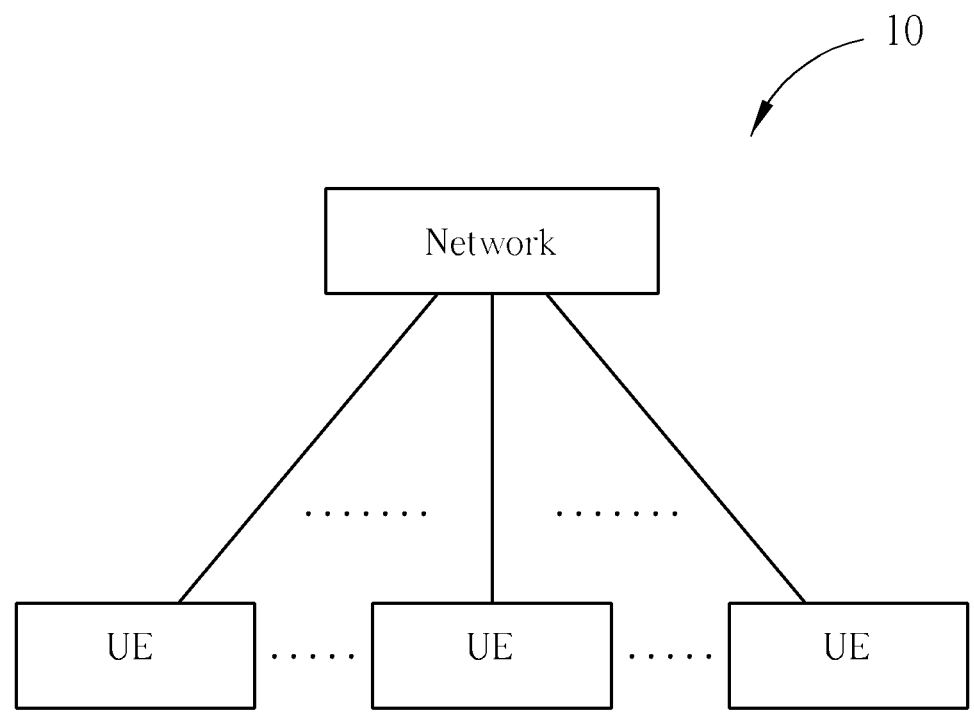
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
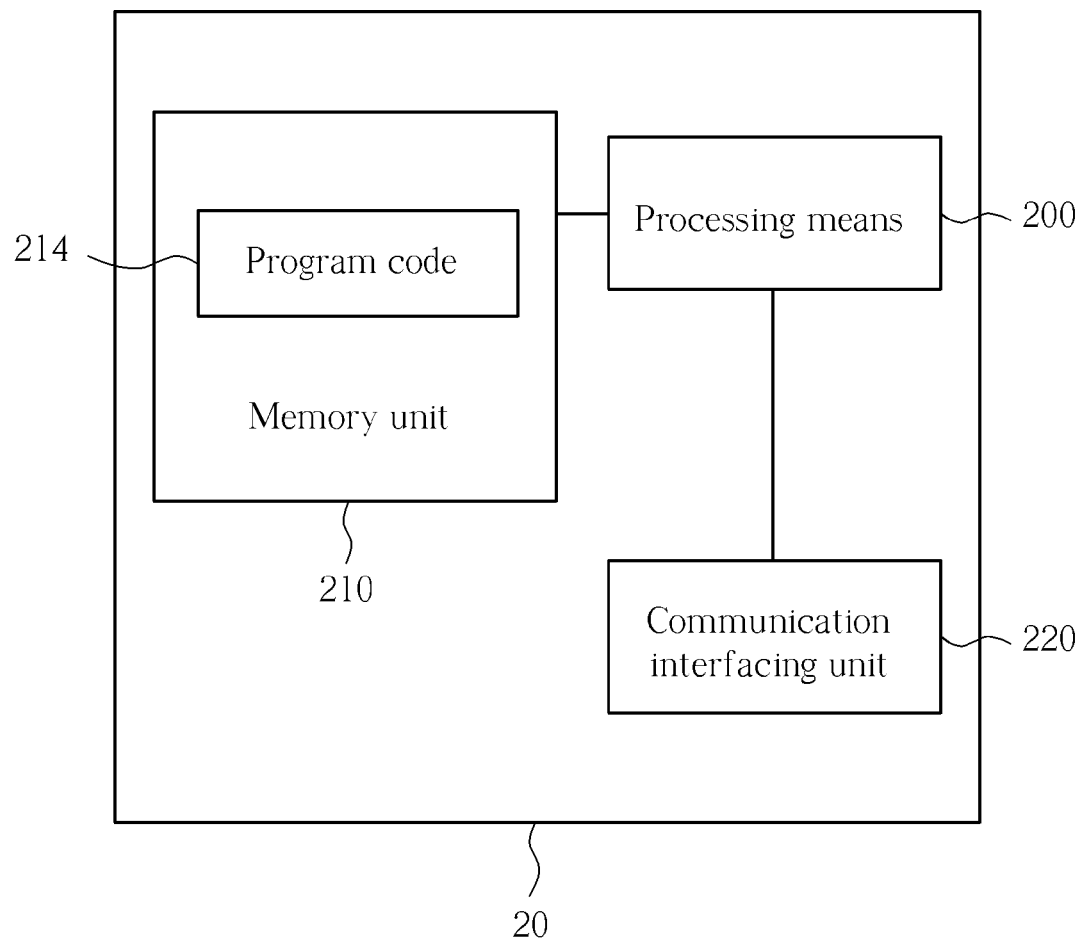
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
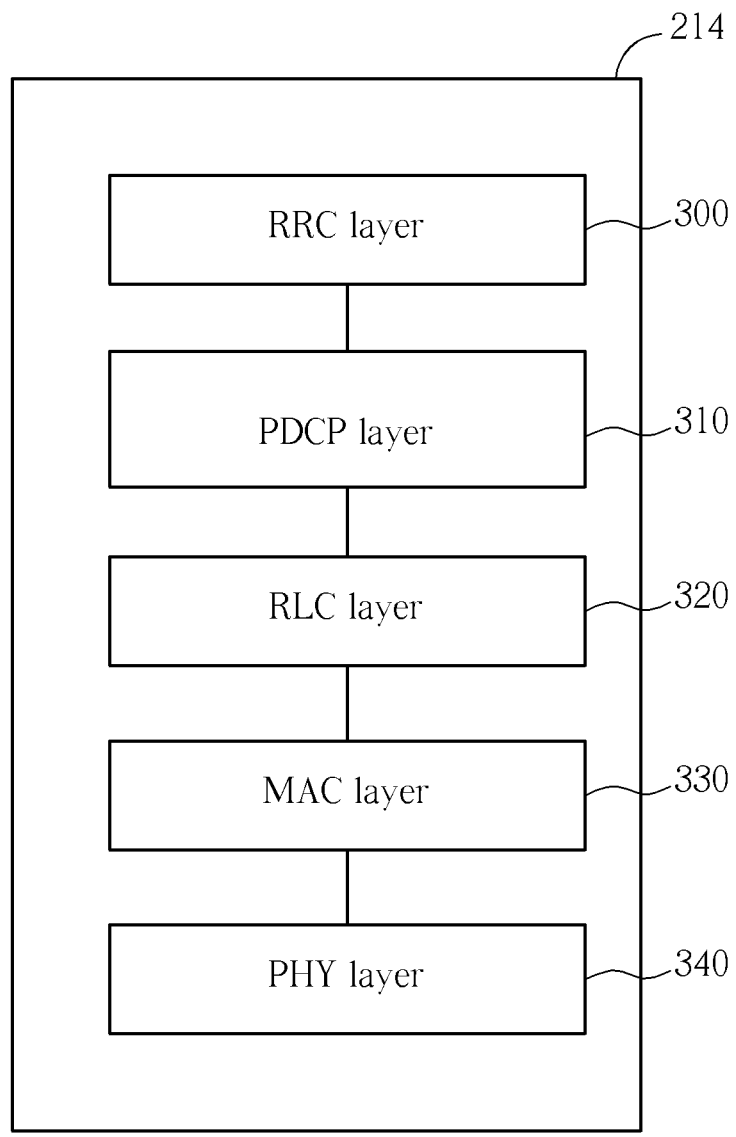
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 includes physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH). The MAC layer 330 can trigger a Power Headroom report (PHR) reporting to assist the network scheduler. The PHR is a margin for the fast power control to track the fast fading and maintain the link quality at the cell boarder.

Figure 4:
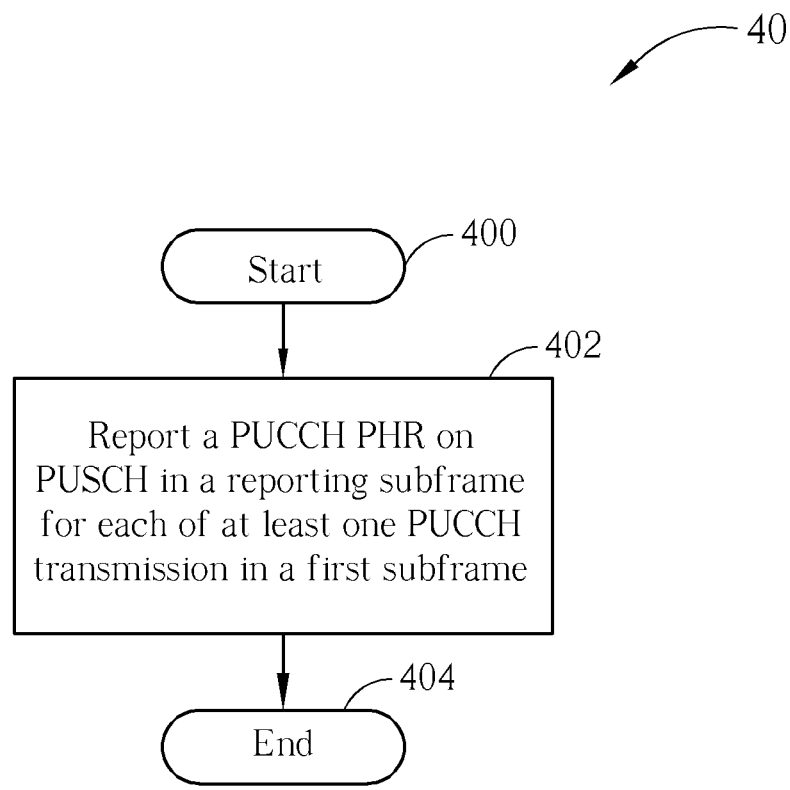
FIG. 4 is a flow chart of an exemplary process.

Please refer to FIG. 4, which is a flow chart of an exemplary process 40. The process 40 is used for power information reporting for enhancing uplink power control for a wireless communication system. The wireless communication system could be the wireless communication system 10. The process 40 can be compiled into the program code 214 and includes the following steps:

Step 400: Start.

Step 402: Report a PUCCH PHR on PUSCH in a reporting subframe for each of at least one PUCCH transmission in a first subframe.

Step 404: End.

According to the process 40, the UE reports the individual PUCCH PHR (e.g. per channel) on PUSCH for each PUCCH transmission. The PUSCH is transmitted on the reporting subframe. One or more PUCCH are transmitted on the first subframe. In other words, the UE does not always send the PUCCH PHR along with PUSCH PHR, thereby obtaining more PHR information of the PUCCH. In addition, by separating the PUCCH PHR from the PUSCH PHR and individually reporting the PUCCH PHR and PUSCH PHR, the UE can avoid detection or detection error. Compared to the prior art, one or more PUCCH regions may be transmitted in the first subframe. Thus, an individual PHR for each PUCCH region should be reported.

The individual PUCCH PHR for each PUCCH transmission includes the latest PUCCH Power Headroom (PH) for latest PUCCH transmission. The latest PUCCH PH may or may be in a reporting subframe. The latest PUCCH PH for the latest PUCCH has not been reported or has been reported. If the lasted PUCCH has been reported, the UE may set a PH value of the PUCCH PHR to a predefined value, specific or a dummy value when the latest PUCCH PHR of the latest PUCCH transmission has been reported and no further PUCCH transmission occurs since the lasted PUCCH transmission. For example, the dummy value can be set in a way that is much larger than the PH value or out of its range. When a network receives the dummy value, the network compares the dummy values with normal PH values, determining that the latest PUCCH PHR of the latest PUCCH transmission has been reported. Preferably, the predefined value is determined or calculated according to a predefined/specific PUCCH format. With individual PUCCH PHR, new PHR format is needed to accommodate per channel PHR, which implies that PHR format should include latest PUCCH PHR for latest PUCCH transmission probably not in the current reporting subframe if a specific PHR format is preferred.

In some examples, the UE may report one or more PUSCH PHRs in the reporting subframe (without any PUCCH PHR or with one or more PUCCH PHRs. The UE may report one or more PUSCH PHRs only when no PUCCH transmission occurs before the reporting subframe or when the latest PUCCH PHR of the latest PUCCH transmission has been reported and no further PUCCH transmission occurs since the lasted PUCCH transmission (e.g. for which latest PUCCH and PUSCH has been reported) or when one or more PUSCH PHRs and one or more PUCCH PHRs are both included only for one of the at least one PUCCH transmission and at least one PUSCH transmission which are simultaneous (e.g. on the same uplink component carrier (UL CC) or different UL CC).

In some examples, the UE may report one or more PUSCH PHR with one or more PUCCH PHRs. Namely, one or more PUCCH PHRs and the PUSCH PHR are always shown together for a PHR report as a format. Preferably, the format could be a fixed format or an extendable format. The UE determines whether the format is the fixed format or the extendable format according the number of the PUCCH transmission and/or the number of the PUSCH transmission. If more than one PUCCH transmission and/or PUSCH transmission are performed, the format could be extendable to accommodate the multiple transmissions. When the multiple PUCCHs and/or PUSCHs are transmitted, each PUCCH transmission in the first subframe and/or each PUSCH transmission in the reporting subframe contributes to one of the PUCCH PHRs and/or one of the PUSCH PHRs (e.g. if it has not been reported) in the extendable format.

Preferably, the first subframe is earlier or equal to the reporting subframe. If the first subframe is earlier, this represents the latest PUCCH transmission occurs independently. If the first subframe is equal to the reporting subframe, it represents one or more PUSCH transmission accompanies the latest PUCCH transmission in the reporting subframe. When the PUCCH PHR is reported only when one or more PUSCH transmission and the PUCCH transmission are simultaneously transmitted in the reporting subframe (e.g. on the same UL CC or different UL CC) the first subframe is always equal to the reporting subframe.

With individual PUCCH PHR for each PUCCH transmission, new PHR format is needed to accommodate per channel PHR, which implies that PHR format should include latest PUCCH PHR for latest PUCCH transmission, probably not in the current reporting subframe, if a specific PHR format is preferred. Thus, the UE may include a PHR format indicator which indicates whether one or more PUCCH PHRs are included or whether both of one or more PUCCH PHRs and one or more PUSCH PHR are included or the number of PUCCH PHRs is included. The UE informs a network that at least one PUSCH PHR is sent along with the PUCCH PHR through to the PHR format indicator. Alternatively, the network can know whether/when there is one or more PUCCH PHRs along with one or more PUSCH PHRs (e.g. for decoding) its own.

Please note that, the PHR reporting is component carrier (CC) specific. In other words, one or more PHR reports on each CC are independent. Or at least one PUSCH PHR on a certain CC only includes one or more PUCCH PHRs and PUSCH PHRs on the same CC. In addition, the PHR reporting may have been triggered in the MAC layer 330.

Figure 5:
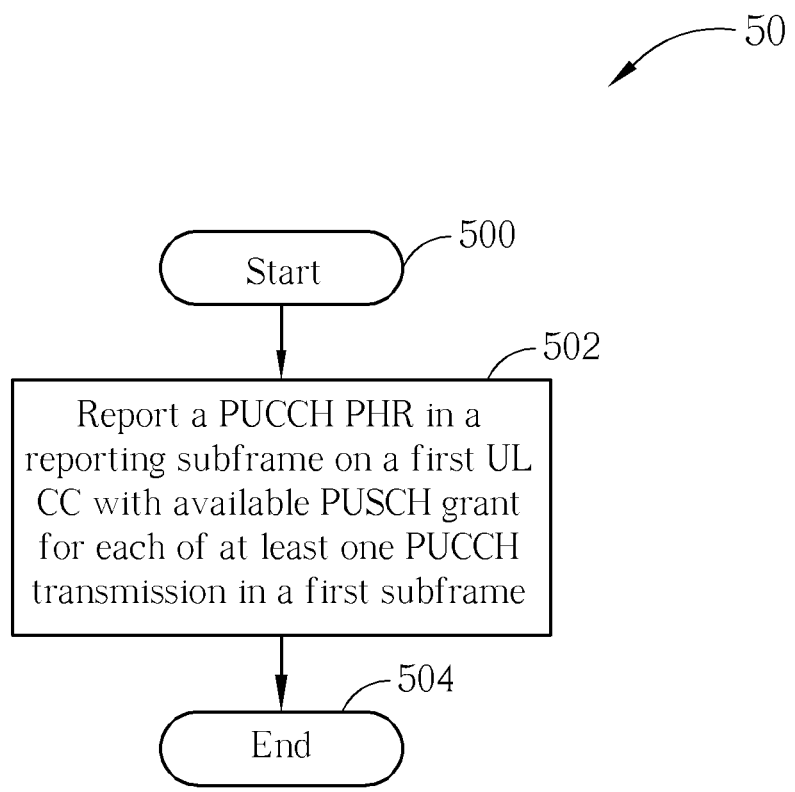
FIG. 5 is a flow chart of an exemplary process.

Please refer to FIG. 5, which is a flow chart of an exemplary process 50. The process 50 is used for enhancing uplink power control for a wireless communication system. The wireless communication system could be the wireless communication system 10. The process 50 can be compiled into the program code 214 and includes the following steps:

Step 500: Start.

Step 502: Report a PUCCH PHR in a reporting subframe on a first UL CC with available PUSCH grant for each of at least one PUCCH transmission in a first subframe.

Step 504: End.

According to the process 50, the UE reports the individual PUCCH PHR (e.g. per channel) in the reporting subframe on the first UL CC with available PUSCH grant. The first UL CC may be at least one of a CC by UE-specific configuration for the at least one PUCCH transmission, one of at least one UL CC used for at least one of the at least one PUCCH transmission, a primary UL CC, one of UL CCs with available PUSCH grant, and the only UL CC with available PUSCH grant. The first UL CC could be a primary UL CC or any UL CC with available PUSCH grant. In other words, the individual (e.g. per channel) PUCCH PHR for each of one or more PUCCH transmission on the first UL CC can be reported by the UE in the reporting subframe only on the primary UL CC with available PUSCH grant for PUSCH on the first UL CC in the reporting subframe, or on any UL CC with available PUSCH grant in the reporting subframe. Consequently, when multiple PUCCH transmissions are allowed, the individual PHR for each PUCCH transmission could be either reported on the first UL CC or on any UL CC with available PUSCH grant in the reporting subframe.

In some examples, the UE may report one or more PUSCH PHRs in a reporting subframe (without the at least one PUCCH PHR or with the at least one PUCCH PHR). The UE reports one or more PUSCH PHRs with the at least one PUCCH PHR corresponding to the at least one of the at least one PUCCH transmission on a PUSCH on the first UL CC in the reporting subframe when the individual PUCCH PHR for each PUCCH transmission on the first UL CC can be reported by the UE in the reporting subframe only on the first UL CC with available PUSCH grant for PUSCH on the first UL CC in the reporting subframe. In this situation, the at least one PUCCH PHR and the at least one PUSCH PHR are always shown together for a PHR report as a format. Preferably, the format could be a fixed format or an extendable format. The UE determines whether the format is the fixed format or the extendable format according the number of the at least one PUCCH transmission and/or the number of the at least one PUSCH transmission. If more than one PUCCH transmission and/or PUSCH transmission are perform, the format could be extendable to accommodate the multiple transmissions. When the multiple PUCCHs and/or PUSCHs are transmitted, each PUCCH transmission in a first subframe and/or each PUSCH transmission in a reporting subframe contributes to at least one PUCCH PHR and/or at least one PUSCH PHR (e.g. if it has not been reported) in the extendable format.

Preferably, the first subframe is earlier or equal to the reporting subframe. If the first subframe is earlier, this represents the latest PUCCH transmission occurs alone. If the first subframe is equal to the reporting subframe, it represents one or more PUSCH transmission accompanies the latest PUCCH transmission in the reporting subframe. When one or more PUCCH PHRs are reported only when the PUSCH transmission and one or more PUCCH transmission are simultaneously transmitted in the reporting subframe (e.g. on the same UL CC or different UL CC) the first subframe is always equal to the reporting subframe.

With individual PUCCH PHR for each PUCCH, new PHR format is needed to accommodate per channel PHR, which implies that PHR format should include latest PUCCH PHR for latest PUCCH transmission probably not in the current reporting subframe if a specific PHR format is preferred. Thus, the UE may include a PHR format indicator which indicates whether one or more PUCCH PHRs are included or whether both of one or more PUCCH PHRs and one or more PUSCH PHR are included or the number of PUCCH PHRs is includes. The UE informs a network that at least one PUSCH PHR is sent along with the PUCCH PHR through to the PHR format indicator. Alternatively, the network can know whether/when there is one or more PUCCH PHRs along with one or more PUSCH PHRs (e.g. for decoding).

In other examples, at least one PUSCH PHR is transmitted on a second UL CC. The second UL CC is any UL CC other than the first UL CC. A network may know which UL CC the PUCCH has been transmitted on. And the PUCCH PHR for the PUCCH transmission is on that UL CC. The network may only expect the at least one PUCCH PHR corresponding to at lease one of the at least one PUCCH transmission on PUSCH from the UE on the first UL CC or only expect the at least one PUSCH PHR from the UE on any UL CC other than the first UL CC. Alternatively, the network does not expect the at least one PUCCH PHR from the UE on any UL CC other than the first UL CC.

Please note that, the PHR reporting is component carrier (CC) specific. In other words, one or more PHR reports on each CC are independent. Or at least one PUSCH PHR on a certain CC only includes one or more PUCCH PHRs and PUSCH PHRs on the same CC. In addition, the PHR reporting may have been triggered in the MAC layer 330.

Figure 6:
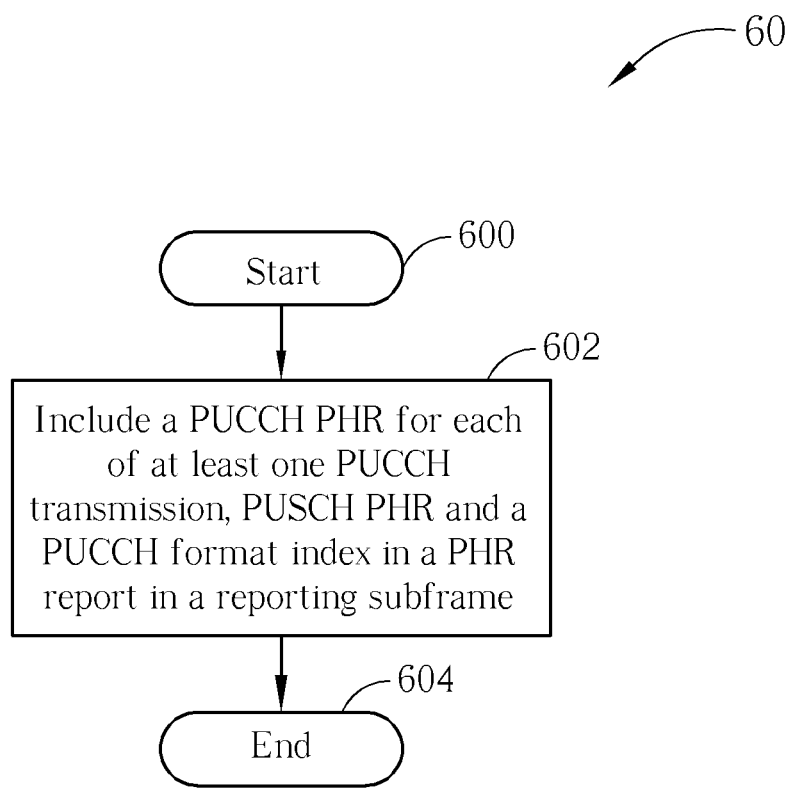
FIG. 6 is a flow chart of an exemplary process.

Please refer to FIG. 6, which is a flow chart of an exemplary process 60. The process 60 is used for enhancing uplink power control for a wireless communication system. The wireless communication system could be the wireless communication system 10. The process 60 can be compiled into the program code 214 and includes the following steps:

Step 600: Start.

Step 602: Include a PUCCH PHR for each of at least one PUCCH transmission, PUSCH PHR and a PUCCH format index in a PHR report in a reporting subframe.

Step 604: End.

According to the process 60, the UE includes the individual PUCCH PHR for each PUCCH transmission, PUSCH PHR and the PUCCH format index in the PHR report in the reporting subframe. Preferably, the size of the PUCCH format index depends on at least one of the number of available PUCCH formats and the number of PUCCH transmissions. Through the PUCCH format index, the UE can provide more accurate information to the network. Therefore, the network can more properly schedule PUSCH, avoiding miss detection, detection error and transmission power control (TPC) command error.

In addition, the UE may use at least one index value or code point of the PUCCH format index for indicating no PUCCH transmission or no PUCCH PHR. The remaining index values that the UE does not used can be reserved for other indications. When corresponding at least one index value of the PUCCH format index does not correspond to validate least one power headroom value of the at least one PUCCH PHR, or the at least one index value of the PUCCH format index indicates no PUCCH PHR or no corresponding PUCCH power headroom value, the network ignoring the at least one PUCCH PHRs. Namely, the PUCCH PH value is valid but index value indicates no PUCCH PHR or PUCCH PH value in a predefined/specific or dummy value but index value indicates the PUCCH format, the eNB ignore the at least one PUCCH PHR.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handle load balancing in the wireless communications system 10.

To sum up, according to examples of the present disclosure, the UE should report the individual PUCCH PHR on PUSCH. The network takes into account PUCCH transmission power contributing to the UE current transmission power so as to assist the network to schedule PUSCH. With individual PUCCH PHR, new PHR format may be needed to accommodate per channel PHR. In addition, the PUCCH PHR could be reported on any UL CC with available PUSCH grant, not limited to the configured UL CC. The PUCCH format can be indicated by a format index to provide accurate information to the eNB. Consequently, eNB can more properly schedule PUSCH. The size of format index depends on the number of available formats. The possible remaining index could be reserved or for other indication (e.g. index to no PUCCH transmission).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of power information reporting for enhancing uplink power control for a mobile device in a wireless communication system, the method comprising:
reporting both of a physical uplink control channel (PUCCH) power headroom report (PHR) and a physical uplink shared channel (PUSCH) PHR as a format on a PUSCH in a reporting subframe; and
informing a network in the wireless communication system that both of the PUSCH PHR and the PUCCH PHR are included in the format through a PHR format indicator.

2. The method of claim 1, wherein the PUCCH PHR includes a latest PUCCH power headroom (PH) for a latest PUCCH transmission.

3. The method of claim 2, wherein the latest PUCCH PH for the latest PUCCH transmission has not been reported.

4. The method of claim 2 further comprising setting a PH value of the PUCCH PHR to a predefined, specific or a dummy value when the latest PUCCH PH of the latest PUCCH transmission has been reported and no further PUCCH transmission occurs since the latest PUCCH transmission.

5. The method of claim 1, wherein the PHR reporting is component carrier specific or the PHR reporting has been triggered.

6. A method of enhancing power information reporting for enhancing uplink power control for a mobile device in a wireless communication system, the method comprising:
reporting a physical uplink control channel (PUCCH) power headroom report (PHR) in a reporting subframe on a first uplink component carrier (UL CC) with available physical uplink shared channel (PUSCH) grant, for each of at least one PUCCH transmission in a first subframe.

7. The method of claim 6, wherein the first UL CC is at least one of a CC by UE-specific configuration for the at least one PUCCH transmission, one of at least one UL CC used for at least one of the at least one PUCCH transmission, a primary UL CC, one of UL CCs with available PUSCH grant, and the only UL CC with available PUSCH grant.

8. The method of claim 6 further comprising reporting at least one PUSCH PHR with at least one PUCCH PHR corresponding to the at least one of the at least one PUCCH transmission on a PUSCH on the first UL CC in the reporting subframe.

9. The method of claim 8, wherein the at least one PUSCH PHR is transmitted on a second UL CC, the second UL CC is any UL CC other than the first UL CC.

10. The method of claim 9 further comprising the network only expecting at least one PUCCH PHR corresponding to at least one of the at least one PUCCH transmission on PUSCH from the mobile device on the first UL CC.

11. The method of claim 9 further comprising the network only expecting the at least one PUSCH PHR from the mobile device on a second UL CC, wherein the second UL CC is any UL CC other than the first UL CC.

12. The method of claim 9 further comprising the network not expecting the at least one PUCCH PHR on PUSCH from the mobile device on a second UL CC, wherein the second UL CC is any UL CC other than the first UL CC.

13. The method of claim 6 further comprising reporting at least one PUSCH PHR in a reporting subframe without any PUCCH PHR or with at least one PUCCH PHR.

14. The method of claim 13 further comprising reporting the at least one PUSCH PHR along with the at least one PUCCH PHR as a format when the at least one PUSCH PHR is reported with the at least one PUCCH PHR.

15. The method of claim 14 further comprising determining whether the format is a fixed format or an extendable format according the number of PUCCH transmission or the number of PUSCH transmission or both of the number of PUCCH transmission and the number of PUSCH transmission.

16. The method of claim 15, wherein at least one of each PUCCH transmission in the first subframe and each PUSCH transmission in the reporting subframe contributes to at least one of at least one PUCCH PHR and at least one PUSCH PHR in the extendable format.

17. The method of claim 16, wherein the first subframe is earlier or equal to the reporting subframe.

18. The method of claim 16, wherein the first subframe is always equal to the reporting subframe when the at least one PUCCH PHR is reported only when the PUSCH transmission and the at least one of the at least one PUCCH transmission are simultaneously transmitted in the reporting subframe.

19. The method of claim 13, wherein reporting the at least one PUSCH PHR in the reporting subframe comprises reporting only the at least one PUSCH PHR when no PUCCH transmission occurs before the reporting subframe or when the latest PUCCH PHR of the latest PUCCH transmission has been reported and no further PUCCH transmission occurs since the lasted PUCCH transmission or when the at least one PUSCH PHR and the at least one PUCCH PHR are both included only for the at least one of the at least one PUCCH transmission and the at least one PUSCH transmission which are simultaneous.

20. The method of claim 13 further comprising including a PHR format indicator which indicates whether the at least one PUCCH PHR is included or whether both of the at least one PUCCH PHR and the at least one PUSCH PHR are included or the number of PUCCH PHRs included.

21. The method of claim 20 further comprising a network knowing whether the at least one PUSCH PHR is sent along with the at least one PUCCH PHR through the PHR format indicator.

22. The method of claim 6 further comprising a network knowing which UL CC PUCCH has been transmitted on.

23. A method of enhancing uplink power control for a mobile device in a wireless communication system, the method comprising:

including an physical uplink control channel (PUCCH) power headroom report (PHR) for each of at least one PUCCH transmission, physical uplink shared channel (PUSCH) PHR and a PUCCH format index in a PHR report in a reporting subframe.

24. The method of claim 23, wherein the size of the PUCCH format index depends on at least one of the number of available PUCCH formats and the number of PUCCH transmissions.

25. The method of claim 23 further comprising using at least one index value or code point of the PUCCH format index for indicating no PUCCH transmission or no PUCCH PHR.

26. The method of claim 23 further comprising reserving at least an unused index value of the PUCCH format index.

27. The method of claim 25 further comprising a network ignoring at least one PUCCH PHR when at least one index value of the corresponding PUCCH format index does not correspond to at least one valid power headroom value of the at least one PUCCH PHR, or the at least one index value of the PUCCH format index indicates no PUCCH PHR or no corresponding PUCCH power headroom value.

* * * * *